Feb. 3, 1953 LE ROY F. YOUNG 2,627,118
VERNIER CONTROLLED INDICATOR ROD CLAMP
Filed July 19, 1948 3 Sheets-Sheet 1
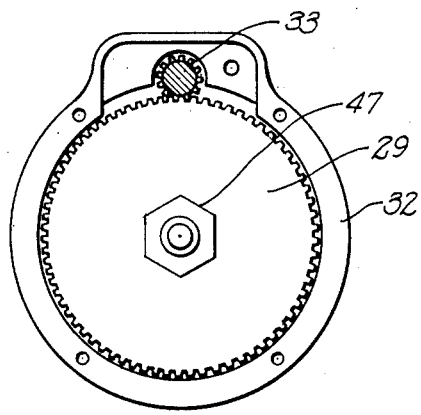
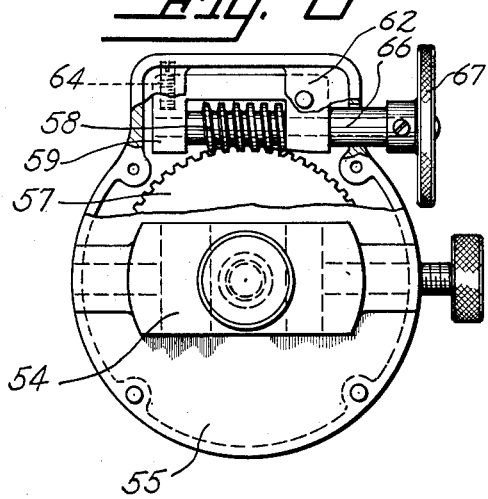
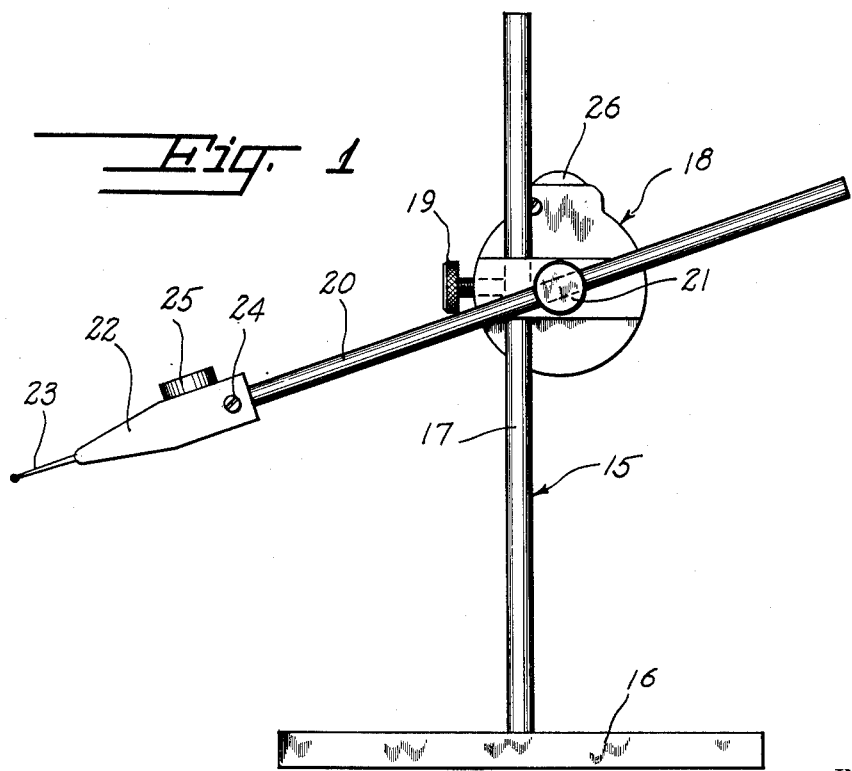
INVENTOR.
Le Roy F. Young
BY Victor J. Evans & Co.
ATTORNEYS Feb. 3, 1953 LE ROY F. YOUNG 2,627,118
VERNIER CONTROLLED INDICATOR ROD CLAMP
Filed July 19, 1948 3 Sheets-Sheet 2
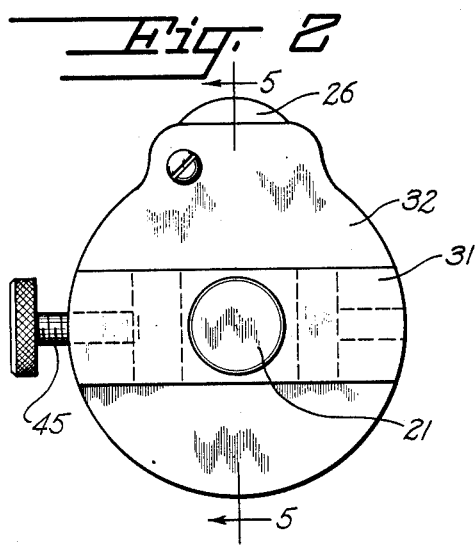
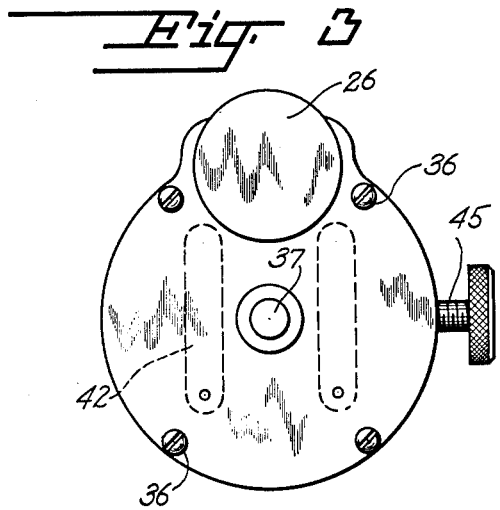
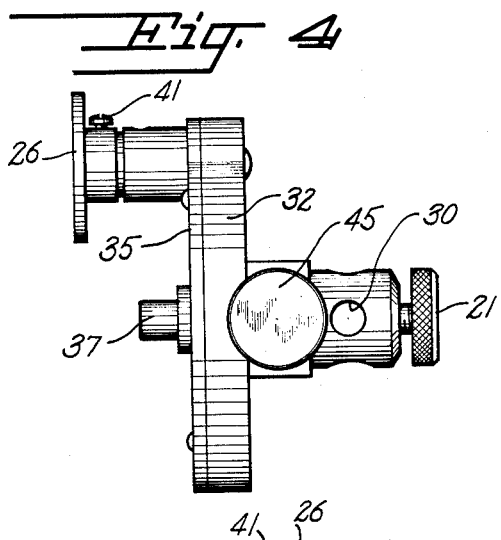
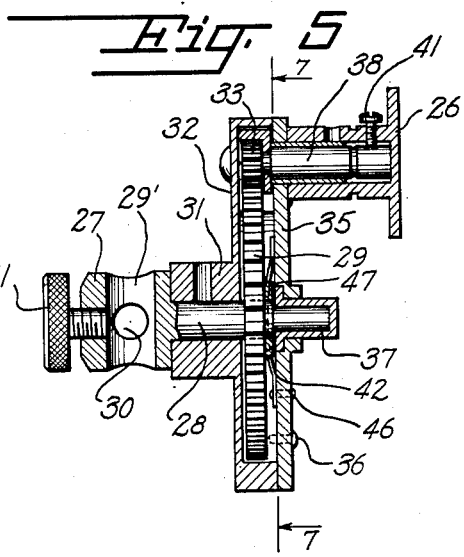
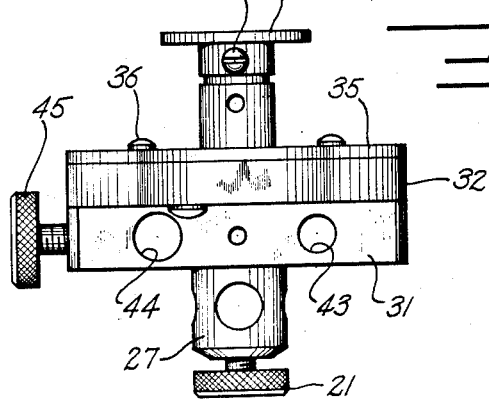
INVENTOR.
Le Roy F. Young
BY Victor J. Evans & Co.
ATTORNEYS

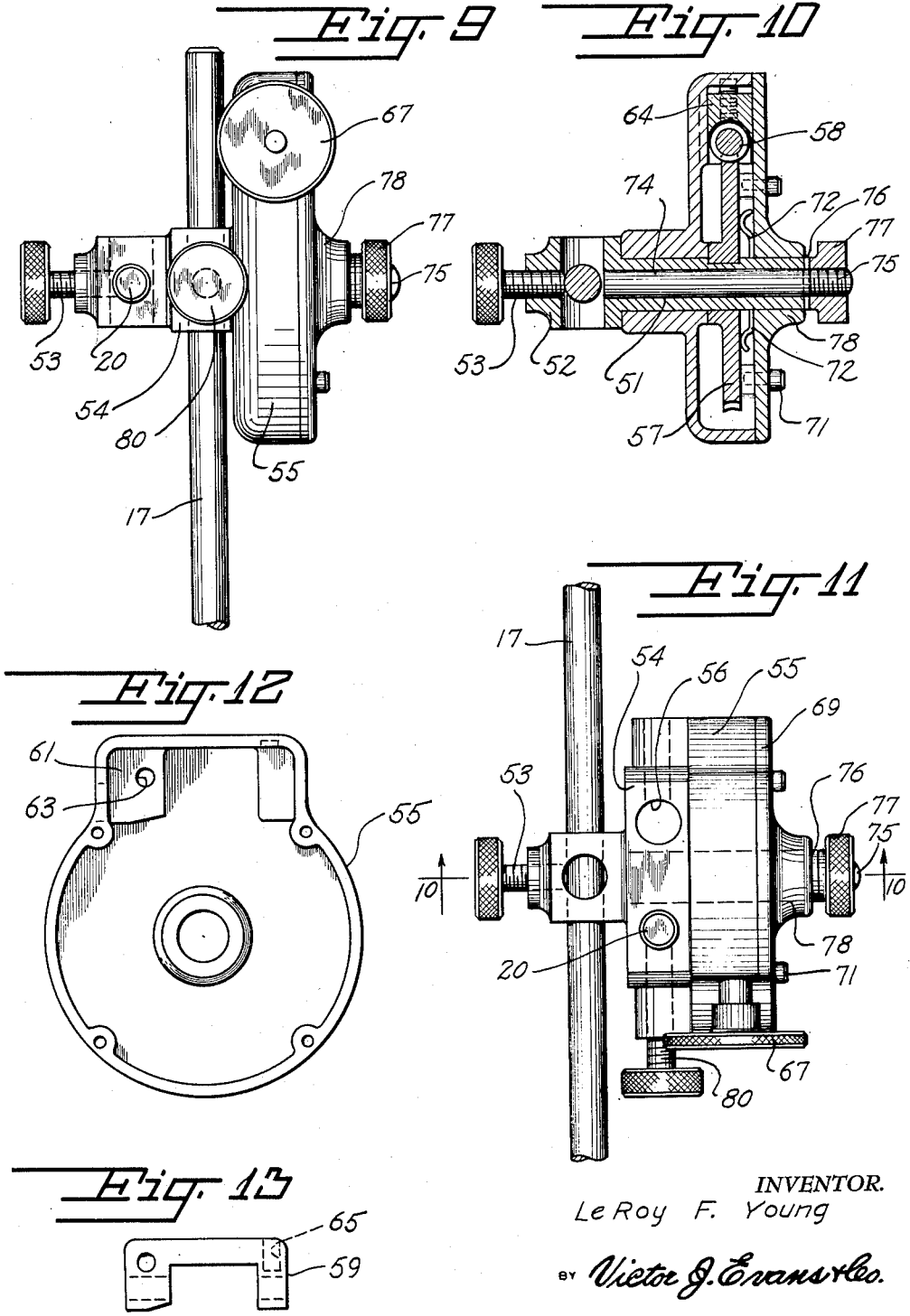

UNITED STATES PATENT OFFICE 2,627,118

VERNIER CONTROLLED INDICATOR ROD CLAMP

Le Roy F. Young, Barrington, R. I.

Application July 19, 1948, Serial No. 39,494

1 Claim. (Cl. 33—169)

This invention relates to a vernier controlled indicator rod clamp.

It is an object of the present invention to provide an indicator rod clamp wherein fine measurements may be made with accuracy and in quick time and by as simple an operation as turning a pinion and gear once the indicator has been approximately positioned on the supporting rod.

Other objects of the present invention are to provide a vernier controlled indicator rod clamp which is of simple construction, easy to adjust on the supporting rod, inexpensive to manufacture, convenient to use, has few parts and efficient in operation.

For other objects and for a better understanding of the invention, reference may be had to the following detailed description taken in connection with the accompanying drawing, in which Fig. 1 is an elevational view of the rod support and of the vernier clamp of the present invention secured thereto.

Fig. 2 is a side elevational view of the clamp.

Fig. 3 is a side elevational view of the clamp looking in the opposite direction and upon the adjusting knob.

Fig. 4 is an end elevational view of the adjusting clamp.

Fig. 5 is a sectional view, in elevation, taken on line 5—5 of Fig. 2.

Fig. 6 is a top plan view of the clamp.

Fig. 7 is a sectional view, in elevation, taken on line 7—7 of Fig. 5, the casing plate being removed to show the gears.

Fig. 8 is a side elevational view of a modified form of clamp with portions broken away to show the internal gearing.

Fig. 9 is an end elevational view of the clamp shown in Fig. 8.

Fig. 10 is a sectional view, in elevation, taken on line 10—10 of Fig. 11.

Fig. 11 is an end elevational view of the clamp shown in Fig. 8 attached to the rod in a different manner than as shown in Fig. 9.

Fig. 12 is an elevational view of one of the casing parts.

Fig. 13 is a side elevational view of the pinion gear support.

Referring now particularly to Figs. 1 to 7, 15 represents a measuring stand comprising a base 16 and an upwardly extending rod or upright 17 on which my vernier controlled indicator rod clamp 18 is supported. The clamp is fixed to the rod 17 by a thumb screw 19. A measuring rod 20 is connected to the vernier rod clamp by a thumb screw 21. The measuring rod 20 has a head 22 with a pointer 23 protruding therefrom. The head 22 is held fixed upon the rod 20 by a set screw 24 and the pointer 23 is held in place on the head 22 by a screw 25. By turning a hand knob 26 on the rod clamp 18, the measuring rod 20 will be adjusted through a vertical angle to properly locate the pointer 23 on the work being measured. To move the clamp to the general height on the rod 17, said screw knob 19 is loosened and the clamp 18 is vertically adjusted on rod 17.

The measuring rod 20 extends through a head 27 of a rotatable support member 28 having large gear 29 fixed thereto. The rod extends through either one of two angularly disposed holes 29' and 30 in the head 27. The rotary member 28 is journalled in a sleeve portion 31 of a casing part 32 enclosing gear 29 and a pinion gear 33. A casing part 35 is secured to the casing part 32 by screws 36. This part has a central bushing 37 receiving the end of the rotor 28. The gear 33 is on the end of a shaft 38 which has a knob 26 secured to it by a set screw 41. This shaft 38 extends through the casing part 35 and the knob 26 encloses it exteriorly of the casing part 35.

A friction element 42 is secured to the rotor 28 and bears against the inner face of casing part 35 whereby to retain the rotor and the measuring rod 20 in any of the positions to which the rod has been adjusted.

The sleeve portion 31 of the casing part 32 has two openings 43 and 44 for securing the clamp to the rod 17. Thumb screw 45 is used for fixing the rod 17 with either of these openings.

The spring or friction element 42 is held in place on the casing part 35 by a pin 46. A nut 47 retains the gear 29 in place against a shoulder on the rotatable member 28.

Referring now to Figs. 8 to 13, there is provided a slightly different form of the invention. A rotatable member 51 has a head 52 with openings therein to receive rod 17 and a set screw 53 for securing the member to the rod. This head 52 also receives the measuring rod 20 in the same manner as shown in Fig. 1, but it will be understood as shown in Fig. 2 that the head may also receive the vertical rod 17 and the measuring rod 20 may be extended through a portion 54 of casing part 55, there being holes 56 disposed respectively at the opposite sides of the portion. The casing part 55 has a helical gear 57 fixed to the member 51 therewithin. In mesh with the gear 57 to drive the same as a worm 58. This worm is mounted in a bracket 59, Fig. 13, fixed to a boss 61 in the casing part 55 by a pin 62 extended into an opening 63 in the boss 61. The member 59 is also retained in the casing part 55 by a screw 64 adjustable in an opening in the member 59. The pinion 58 has a shaft extension 66 with a turn knob 67 fixed thereto. Upon rotation of the knob 67, the rotatable member 52 will be turned and the measuring rod will be adjusted to a different elevation if the indicator rod clamp is fixed to the rod 17 by its extension through an opening 56 as in Fig. 9. If the clamp is connected in the manner as shown in Fig. 11 and the measuring rod extending through the opening 56, the clamp casing will be rotated relative to the member 51, the member 51 being fixed upon the rod 17 by the set screw 53.

A casing part 69 is fixed to the part 55 by screws 71. Between this part and the gear 57 is a friction element 72 for retaining the gear in any position to which it has been adjusted.

A spindle 74 is fixed within the member 51 and is threaded at its outer end as indicated at 75. A washer 76 surrounds the threaded end 75 and a thumb nut 77 upon being tightened against the washer will fix the member 51 in the casing part, the washer 76 being brought to bear against a boss 78 on the casing part 69. The nut 77 is loosened when the adjustment is being effected with the turn knob 67. A turn screw 80 extends into the portion 54 for retaining the measuring rod 20 as shown in Fig. 11. As shown in Fig. 9, this same screw 80 serves to fix the portion 74 of the casing part 55 to the rod support 17.

It should be apparent that there has been provided an indicator clamp in which fine adjustments can be made once the clamp has been set to the general location on the support rod and wherein the adjustment of the same can be effected in a simple manner to accurately measure a work piece.

While various changes may be made in the detail construction, it shall be understood that such changes shall be within the spirit and scope of the present invention as defined by the appended claim.

I claim:

In an indicating device, a measuring stand comprising a base, a vertically disposed upright extending upwardly from said base, a clamp adjustably connected to said upright, a measuring rod adjustably connected to said clamp, a thumb screw for maintaining said clamp immobile on said upright, a head arranged on an end of said rod, a pointer detachably connected to said head, said clamp comprising a head provided with a hole for slidably receiving said rod, a rotatable support member extending from said head, a central gear secured to said support member, a casing enclosing said gear and including a first part having a sleeve portion rotatably embracing said support member, a second part connected to said first part, a bushing arranged centrally of said second part for receiving an end of said support member, a shaft projecting from said casing, a pinion gear mounted on the inner end of said shaft and meshing with said central gear, a knob connected to said shaft, and a friction element connected to said support member and bearing against the inner face of said second casing part.

LE ROY F. YOUNG.

REFERENCES CITED

The following references are of record in the file of this patent:

UNITED STATES PATENTS

| Number | Name | Date |
|---|---|---|
| 519,703 | Ekman | May 15, 1894 |
| 649,011 | Szafka | May 8, 1900 |
| 1,001,986 | Romancsik | Aug. 29, 1911 |
| 1,366,396 | Loefler | Jan. 25, 1921 |
| 1,765,028 | Moehler | June 17, 1930 |
| 2,267,583 | Carroll | Dec. 23, 1941 |

FOREIGN PATENTS

| Number | Country | Date |
|---|---|---|
| 17,041 | England | July 18, 1914 |